United States Patent
Aoyama et al.

(10) Patent No.: US 10,909,385 B2
(45) Date of Patent: Feb. 2, 2021

(54) IMAGE MONITORING SYSTEM, IMAGE MONITORING METHOD, AND IMAGE MONITORING PROGRAM

(71) Applicant: NEC Corporation, Tokyo (JP)

(72) Inventors: Tetsuji Aoyama, Tokyo (JP); Shunichi Kinoshita, Tokyo (JP); Tomoki Nishikawa, Tokyo (JP); Kazuhiko Kimura, Tokyo (JP); Mitsuko Ooga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/499,392

(22) PCT Filed: Mar. 14, 2018

(86) PCT No.: PCT/JP2018/009959
§ 371 (c)(1),
(2) Date: Sep. 30, 2019

(87) PCT Pub. No.: WO2018/180494
PCT Pub. Date: Oct. 4, 2018

(65) Prior Publication Data
US 2020/0050869 A1    Feb. 13, 2020

(30) Foreign Application Priority Data
Mar. 30, 2017   (JP) .................................. 2017-066909

(51) Int. Cl.
*G01W 1/10*   (2006.01)
*H04N 5/225*   (2006.01)
(Continued)

(52) U.S. Cl.
CPC ........... *G06K 9/00771* (2013.01); *G01W 1/10* (2013.01); *G06T 7/90* (2017.01)

(58) Field of Classification Search
CPC ........ G06K 9/00771; G01W 1/10; G06T 7/90
(Continued)

(56) References Cited

U.S. PATENT DOCUMENTS 10,613,252 B1 *   4/2020   Mecikalski ............. G01W 1/10
2016/0133021 A1   5/2016   Gouda et al.

FOREIGN PATENT DOCUMENTS

JP   2000-341677 A   12/2000
JP   2001-169270 A   6/2001
(Continued)

OTHER PUBLICATIONS

International Search Report for PCT Application No. PCT/JP2018/009959 dated Apr. 17, 2018.

*Primary Examiner* — Christopher Braniff (57) ABSTRACT

An image monitoring system is provided with: a region forecast acquiring unit (101) for acquiring a region forecast which is predictive information about a predetermined item designated as a factor causing a change in a capture environment that is the environment of a capture region, wherein the predictive information serves as predictive information about the predetermined item at a future time in a predetermined region including the capture region where an image to be image-analyzed is captured; a change index specifying unit (102) for specifying, based on the acquired region forecast, a change index including at least a change timeslot that is a timeslot during which the change in the capture environment is brought about; and a detection sensitivity setting unit (103) for altering, based on the specified change index, a setup parameter that is a parameter for detecting an abnormality in the image analysis.

11 Claims, 8 Drawing Sheets

(51) Int. Cl.
*H04N 7/18* (2006.01)
*G06K 9/00* (2006.01)
*G06T 7/90* (2017.01)

(58) Field of Classification Search
USPC ........................................................ 348/143
See application file for complete search history.

(56) References Cited

FOREIGN PATENT DOCUMENTS

JP      2009-055077 A     3/2009
WO      2014/203523 A1    12/2014

* cited by examiner

```
DETECTION SENSITIVITY                                    100
ADJUSTMENT DEVICE
   101              102                    103
┌──────────────┐  ┌──────────────┐  ┌──────────────┐
│REGION FORECAST│──│CHANGE INDEX  │──│  DETECTION   │
│ACQUIRING UNIT │  │SPECIFYING UNIT│  │ SENSITIVITY  │
│              │  │              │  │ SETTING UNIT │
└──────────────┘  └──────┬───────┘  └──────────────┘
                         │    104
                    ┌────┴─────┐
                    │INFORMATION│
                    │ STORAGE  │
                    │   UNIT   │
                    └──────────┘
```

FIG. 5

| TIME t | DETECTION SENSITIVITY s | DEGREE OF INFLUENCE E |
|---|---|---|
| t ≤ 6:36 | 0.7 | 0.0 |
| 6:36 < t < 6:56 | 0.2 | 0.5 |
| 6:56 ≤ t ≤ 16:21 | 0.7 | 0.0 |
| 16:21 < t < 16:41 | 0.2 | 0.5 |
| 16:41 ≤ t | 0.7 | 0.0 |

FIG. 6

| TIME t | DETECTION SENSITIVITY s | DEGREE OF INFLUENCE E |
|---|---|---|
| t ≤ 6:36 | 0.7 | 0.0 |
| 6:36 < t < 6:56 | 0.2 ~ 0.65<br>※ $0.2 + 0.05 * \|t - t_{SR}\|$ | 0.05 ~ 0.5<br>※ $0.05 * (10 - \|t - t_{SR}\|)$ |
| 6:56 ≤ t ≤ 16:21 | 0.7 | 0.0 |
| 16:21 < t < 16:41 | 0.2 ~ 0.65<br>※ $0.2 + 0.05 * \|t - t_{SS}\|$ | 0.05 ~ 0.5<br>※ $0.05 * (10 - \|t - t_{SS}\|)$ |
| 16:41 ≤ t | 0.7 | 0.0 |

| RELIABILITY | TIME WIDTH [MINUTE] |
|---|---|
| 0.2 | 120 |
| 0.4 | 60 |
| 0.6 | 30 |
| 0.8 | 20 |
| 1.0 | 10 |

| RELIABILITY | TIME WIDTH [MINUTE] | CHANGE PATTERN | REFERENCE DEGREE OF INFLUENCE |
|---|---|---|---|
| 0.2 | 120 | A | 0.2 |
| 0.4 | 60 | A | 0.3 |
| 0.6 | 30 | B | 0.5 |
| 0.8 | 20 | B | 0.7 |
| 1.0 | 10 | C | 0.7 |

FIG. 16

IMAGE MONITORING SYSTEM, IMAGE MONITORING METHOD, AND IMAGE MONITORING PROGRAM

This application is a National Stage Entry of PCT/JP2018/009959 filed on Mar. 14, 2018, which claims priority from Japanese Patent Application 2017-066909 filed on Mar. 30, 2017, the contents of all of which are incorporated herein by reference, in their entirety.

TECHNICAL FIELD

The present invention relates to an image monitoring system, an image monitoring method, and an image monitoring program analyzing an image obtained by capturing a monitoring region and detecting an abnormality.

BACKGROUND ART

There exists an image analysis technique for analyzing an image obtained by capturing a monitoring region in real time and detecting an abnormality on the basis of a change in a picture in the image and for detecting a moving object (movable object) from an image and detecting an abnormality on the basis of an action of the movable object. In the image analysis technique, a movable object in an image is identified as a specially defined object such as a person, a car, and an object, and an action thereof is tracked, for example, to achieve high-accuracy action detection.

Such an image analysis technique is often used for monitoring such as monitoring of a suspicious individual's intrusion into a building.

However, in a monitoring system using such an image analysis technique, when a capture environment, which is an environment of a monitoring region, changes, false detection may be generated. The reason for this is that a change in the capture environment such as a change in the sunshine conditions or the weather has a large influence on analysis performance and detection performance in the image analysis technique.

For example, when a capture environment (such as brightness) changes along with sunset or rainfall, the change in the image may be detected as an abnormality, and due to a change in a feature of a movable object in the image along with the change, false detection may be generated such as detection of the movable object or an action thereof as a suspicious object or an abnormal action.

As for such problems in the monitoring system using an image caused by a change in the capture environment, techniques described in Patent Literature 1 and 2 are provided, for example.

Patent Literature 1 describes a technique for extracting from a captured image a light region generated when strong light such as sunlight is incident in a monitoring region, that is, a region having significantly high luminance, and lowering the sensitivity for detection to a change generated in the region. Patent Literature 1 describes, as an example of lowering the sensitivity, setting a setting moving distance (corresponding to a threshold value for a moving distance in the change region used to determine an intruder) set to detect an intruder to be longer than in a case of a normal luminance region.

Also, for example, Patent Literature 2 describes a technique for, in order to reduce false detection due to a change in an image caused by temporal fluctuation of the weather, the sunshine, and the like, automatically estimating the weather and the sunshine state on the basis of statistical distribution of a feature amount derived from the image and raising/lowering the sensitivity of a camera or resetting a detection region on the basis of an estimation result.

CITATION LIST

Patent Literature

PTL 1: Japanese Patent Application Laid-Open No. 2000-341677
PTL 2: Japanese Patent Application Laid-Open No. 2001-169270

SUMMARY OF INVENTION

Technical Problem

However, in each of the techniques described in Patent Literature 1 and 2, an image is analyzed to detect a region or a state satisfying a predetermined condition, and in a case in which such a region or a state is detected, detection accuracy is adjusted. However, such a method cannot deal with a case in which the accuracy for analyzing the image itself changes along with the change in the capture environment and a change other than an environmental change assumed in advance. For example, in a case of a change in the weather, there are various patterns in changes in the image generated by the weather change, such as not only the image's gradually getting dark along with sunset but also switching to an infrared camera mode, getting dark due to rainfall, recovery from the darkness, generation of a paddle due to rainfall, and a combination thereof. In addition, each pattern has a different optimal setting value and a different time length to keep the setting value.

However, it is difficult to detect and accurately distinguish merely by means of image analysis all changes in the image generated due to such various changes in the capture environment.

Meanwhile, although Patent Literature 2 provides a method with use of another means such as another sensor and manual input work as another method for acquiring information about the weather and the sunshine conditions and setting a detection condition in an optimal form to the time, a specific method therefor is not disclosed.

Since it is difficult to follow up changes in the capture environment by means of image analysis, the above method of using external information is considered as being effective as a method for adjusting a parameter for abnormality detection along with the changes in the capture environment. However, for example, optimal adjustment cannot be achieved only by reflecting the change on the parameter on the basis of time at which information about the weather and the sunshine conditions is acquired. The reason for this is that not only time of the weather change or time of the sunshine conditions change that the acquired information indicates is time at which the capture environment changes. For example, optimal parameter setting cannot be achieved without consideration of a length of time enough to cause the change of the weather or the sunshine conditions indicated by the acquired information to have an influence on the capture environment.

The present invention is accomplished by taking such problems as mentioned above into consideration thereof, and an object thereof is to provide an image monitoring system, an image monitoring method, and an image monitoring program enabling a parameter for abnormality detection in image analysis to be adjusted optimally along with changes in a capture environment.

Solution to Problem

An image monitoring system according to the present invention includes a region forecast acquiring means that acquires a region forecast which is predictive information about a predetermined item designated as a factor causing a change in a capture environment that is the environment of a capture region, wherein the predictive information serves as predictive information about the predetermined item at a future time in a predetermined region including the capture region where an image to be image-analyzed is captured, a change index specifying means that specifies, based on the acquired region forecast, a change index including at least a change timeslot that is a timeslot during which the change in the capture environment is brought about, and a change means that changes, based on the specified change index, a setup parameter that is a parameter for detecting an abnormality in the image analysis.

Also, an image monitoring method according to the present invention includes acquiring a region forecast which is predictive information about a predetermined item designated as a factor causing a change in a capture environment, wherein the predictive information serves as predictive information about the predetermined item at a future time in a predetermined region including the capture region where an image to be image-analyzed is captured, specifying, based on the acquired region forecast, a change index including at least a change timeslot, which is a timeslot in which a visual change is liable to be generated in the capture region, and changing, based on the specified change index, a setup parameter that is a parameter for detecting an abnormality in the image analysis.

Also, an image monitoring program according to the present invention causes a computer to execute processing of acquiring a region forecast which is predictive information about a predetermined item designated as a factor causing a change in a capture environment, wherein the predictive information serves as predictive information about the predetermined item at a future time in a predetermined region including the capture region where an image to be image-analyzed is captured, processing of specifying, based on the acquired region forecast, a change index including at least a change timeslot, which is a timeslot in which a visual change is liable to be generated in the capture region, and processing of changing, based on the specified change index, a setup parameter that is a parameter for detecting an abnormality in the image analysis.

Advantageous Effects of Invention

According to the present invention, a parameter for abnormality detection in image analysis can be adjusted optimally along with changes in a capture environment.

DESCRIPTION OF EMBODIMENTS

Hereinbelow, exemplary embodiments of the present invention will be described with reference to the drawings. Although various examples can be thought of as those of a parameter for abnormality detection which the present invention targets at, the parameter will collectively be referred to as a phrase "detection sensitivity".

First Exemplary Embodiment

Figure 1:
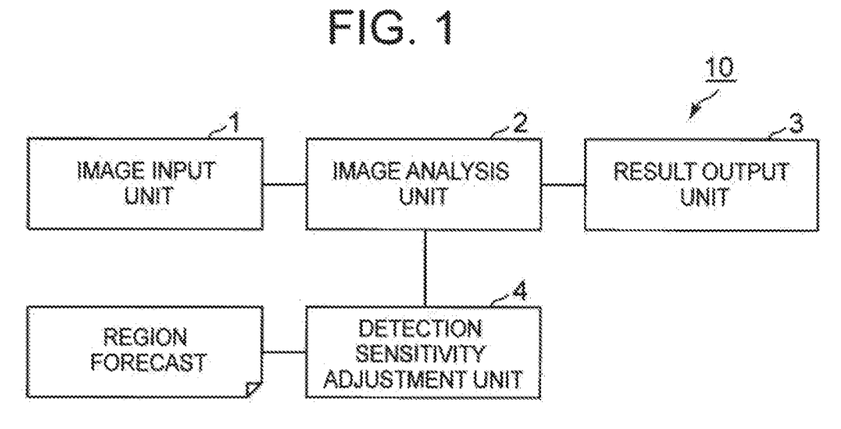
FIG. 1 is a block diagram showing a configuration example of an image monitoring system according to a first exemplary embodiment.

FIG. 1 is a block diagram showing a configuration example of an image monitoring system according to a first exemplary embodiment. As shown in FIG. 1, an image monitoring system 10 according to the present exemplary embodiment includes an image input unit 1, an image analysis unit 2, a result output unit 3, and a detection sensitivity adjustment unit 4.

The image input unit 1 inputs an image to be image-analyzed. The input image is an image obtained by capturing a predetermined monitoring region, for example. The image input unit 1 is achieved by an image capturing unit such as a camera unit.

The image analysis unit 2 analyzes the image input by the image input unit 1 to detect an abnormality in the monitoring region. The image analysis unit 2 detects an abnormality on the basis of a change in a picture in the image and detects a movable object from an image and detecting an abnormality on the basis of an action of the movable object. Note that a method for detecting an abnormality is not particularly limited. However, at the time of detecting an abnormality, detection sensitivity set by the below-mentioned detection sensitivity adjustment unit 4 is used.

The result output unit 3 outputs an analysis result or a detection result provided by the image analysis unit 2. The result output unit 3 may be a device outputting an alarm or a display device displaying an analysis result or a detection result as well as an input image.

The detection sensitivity adjustment unit 4 adjusts detection sensitivity serving as a parameter for detection that the image analysis unit 2 uses.

Each of the image analysis unit 2 and the detection sensitivity adjustment unit 4 is achieved by an information processing unit operating in accordance with a program such as a CPU, for example.

Figure 2:
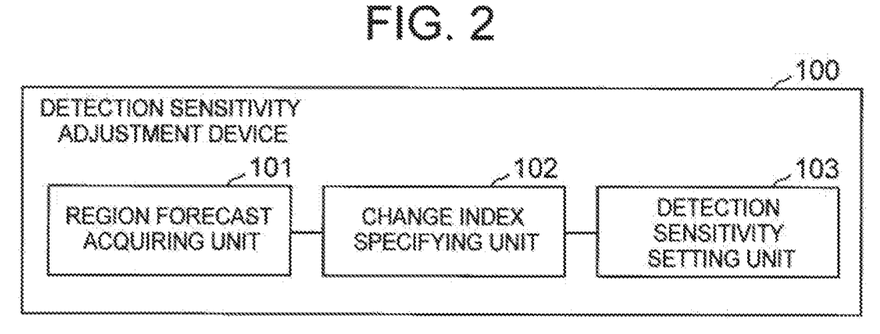
FIG. 2 is a block diagram showing a configuration example of a detection sensitivity adjustment device 100.

Also, FIG. 2 is a block diagram showing a configuration example of the detection sensitivity adjustment unit 4. The example shown in FIG. 2 is a configuration example of a detection sensitivity adjustment device 100 operated as the detection sensitivity adjustment unit 4.

The detection sensitivity adjustment device 100 shown in FIG. 2 includes a region forecast acquiring unit 101, a change index specifying unit 102, and a detection sensitivity setting unit 103.

The region forecast acquiring unit 101 acquires predictive information about a predetermined item at a future time in a predetermined region including a capture region (the aforementioned monitoring region) in which an image to be image-analyzed is captured. The region forecast acquiring unit 101 may acquire predictive information about a predetermined item designated as a factor causing a change in the capture environment, for example. Hereinbelow, the predictive information in the predetermined region including the capture region that the region forecast acquiring unit 101 acquires is referred to as a region forecast in some cases.

The region forecast acquiring unit 101 may acquire, as the region forecast, predictive information about a predetermined item regarded as a factor causing a change in an illumination state in the capture region, for example.

Examples of such a predetermined item are sunrise time, sunset time, the rainfall amount, the sunshine amount, the snow amount, the weather, the wind amount, a solar eclipse, a street lamp, and an indoor illumination.

Meanwhile, specific examples of the region forecast are sunrise and sunset time information indicating sunrise time, sunset time, and the like at each predetermined point provided by the National Astronomical Observatory of Japan or the like and weather forecast information indicating information about the weather at future time at each predetermined point provided by the Japan Meteorological Agency or the like. Meanwhile, the information about the weather includes information about the weather, the sunshine amount, the rainfall amount, the cloud amount, the snow amount, and the like.

On the basis of the acquired region forecast, the change index specifying unit 102 specifies a change index including at least a change timeslot, which is a timeslot during which a change in the environment in the capture region is brought about. More specifically, the change timeslot is defined as information including time when a state comes in which a change (especially, a visual change) in the environment in the capture region may be generated and the duration thereof. Also, the visual change means an environmental change except an environmental change that cannot be detected visually such as temperature and smell.

The detection sensitivity setting unit 103 changes detection sensitivity of the image analysis unit 2 on the basis of the specified change index. The detection sensitivity setting unit 103 may be set so that the detection sensitivity may be lowered only in the change timeslot included in the change index, for example.

Meanwhile, the change index specifying unit 102 may further specify a change index including the degree of influence which the change in the change timeslot has on the analysis performance of the image analysis and a change pattern thereof.

In this case, the detection sensitivity setting unit 103 may set a value corresponding to the degree of influence and the change pattern thereof in the specified change timeslot as the detection sensitivity in the change timeslot, for example.

For example, the detection sensitivity setting unit 103 may increase the lowering range of the detection sensitivity in the specified change timeslot in a case in which the degree of influence in the change timeslot is large and may decrease the lowering range of the detection sensitivity in the change timeslot in a case in which the degree of influence in the change timeslot is small. In this manner, the detection sensitivity setting unit 103 may set the detection sensitivity to correspond to the degree of influence in the change timeslot.

Also, for example, the detection sensitivity setting unit 103 may increase the lowering range of the detection sensitivity at time in the change timeslot at which the degree of influence is large and may decrease the lowering range of the detection sensitivity at time in the change timeslot at which the degree of influence is small. In this manner, the detection sensitivity setting unit 103 may set the detection sensitivity to correspond to the time in the change timeslot at which the degree of influence changes.

Also, for example, the detection sensitivity setting unit 103 may set the detection sensitivity on the basis of other information in addition to the change index. For example, the detection sensitivity setting unit 103 may be set so that, when information indicating a change on the side of the image input unit 1 (for example, switching of the camera mode) is notified, the detection sensitivity may be lowered at the time of the switching. Also, for example, the detection sensitivity setting unit 103 may be set so that, when sensor information is acquired from an illuminance sensor installed in the image input unit 1 or around the capture region, and the illuminance value significantly changes, the detection sensitivity may be lowered.

Figure 3:
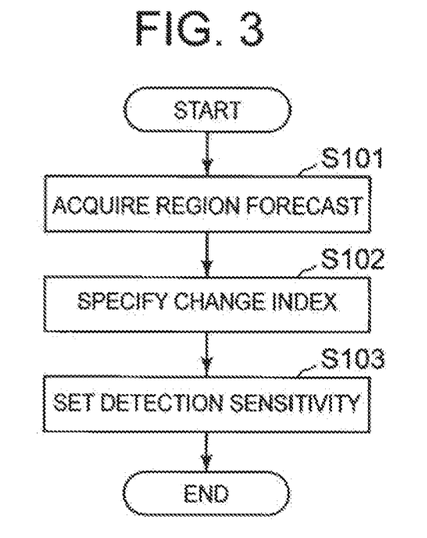
FIG. 3 is a flowchart showing an example of operation of the detection sensitivity adjustment device 100 according to the first exemplary embodiment.

FIG. 3 is a flowchart showing an example of operation of the detection sensitivity adjustment device 100 according to the present exemplary embodiment. In the example shown in FIG. 3, the region forecast acquiring unit 101 acquires a region forecast (step S101).

Subsequently, the change index specifying unit 102 specifies a change index on the basis of the region forecast acquired in step S101 (step S102).

Finally, the detection sensitivity setting unit 103 changes detection sensitivity of the image analysis unit 2 on the basis of the change index specified in step S102 (step S103).

Figure 4:
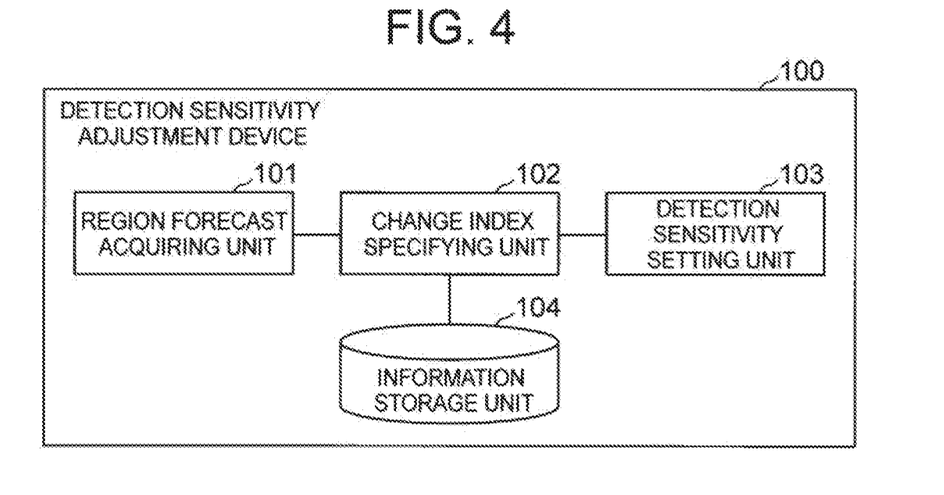
FIG. 4 is a block diagram showing another configuration example of the detection sensitivity adjustment device 100.

The above operation is performed at predetermined timing such as at timing designated by a user and at predetermined intervals. Meanwhile, the operation in step S102 and the operation in step S103 may be performed separately. That is, the information of the change index specified by the change index specifying unit 102 may be stored in a predetermined storage unit (for example, an information storage unit 104 in FIG. 4), and the detection sensitivity setting unit 103 may change the detection sensitivity on the basis of the information of the change index stored in the storage unit at separate timing.

Next, a method for specifying the change index according to the present exemplary embodiment will be described by providing specific examples.

For example, in a case in which sunrise and sunset time information in a region including the capture region is acquired as region information, on the basis of sunrise time and sunset time in the capture region provided in the sunrise and sunset time information, the change index specifying unit 102 may specify each predetermined several-minute period before and after the time as the change timeslot.

In this case, in a case in which the present time is included in the change timeslot, for example, the detection sensitivity setting unit 103 may set as the detection sensitivity a lower value than a predetermined value or a value set before the change timeslot comes.

Also, the change index specifying unit 102 may assume that the degree of influence gradually increases as the sunrise time or the sunset time is closer and may specify not only the change timeslot but also the degree of influence and a parameter indicating the gradual change as the degree of influence and a change pattern thereof in the change timeslot.

Figure 5:
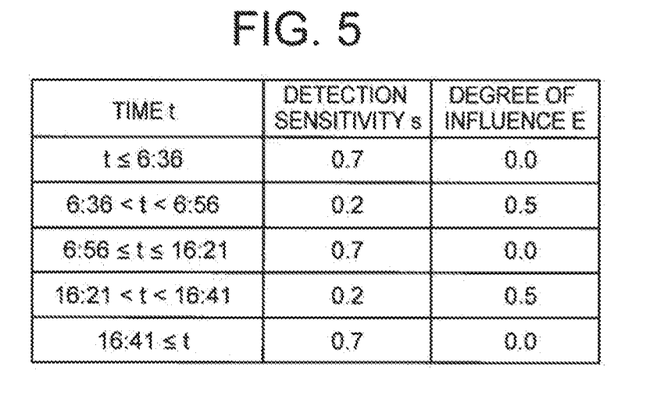
FIG. 5 is an explanatory diagram showing an example of setting detection sensitivity.
Figure 6:
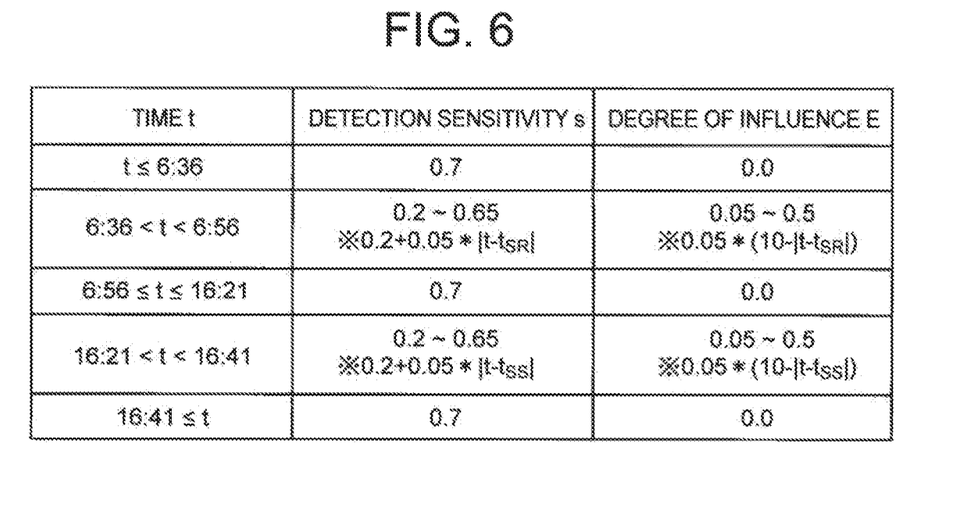
FIG. 6 is an explanatory diagram showing an example of setting the detection sensitivity.

Each of FIGS. 5 and 6 is an explanatory diagram showing an example of setting the detection sensitivity. Note that this is an example of setting detection sensitivity s in a case in which the range of the detection sensitivity s is 0 or more and less than 1, in which the sunrise time is 6:46, in which the sunset time is 16:31, and in which the current time is t.

The example shown in FIG. 5 is an example in which the change index specifying unit 102 specifies a degree of influence E in each ten-minute period before and after the sunrise time or the sunset time as +0.5, and in which the detection sensitivity setting unit 103 changes the detection sensitivity in the change timeslot to $s=s_O-E$. In this equation, $s_O$ represents the detection sensitivity in a timeslot other than the change timeslot.

Also, the example shown in FIG. 6 is an example in which the change index specifying unit 102 computes the degree of influence E with use of Equation (1) shown below.

$$E=0.05*(10-|t-t_R|) \quad (1)$$

In this equation, $t_R$ represents forecast time for an item causing a change. The forecast time corresponds to sunset time $t_{SR}$ in a case in which the item is a sunset forecast, and the forecast time corresponds to sunrise time $t_{SS}$ in a case in which the item is a sunrise forecast. Meanwhile, |a−b| represents an absolute value of a difference (minute) between time a and time b.

As shown in FIG. 6, the change index specifying unit 102 may set forecast time as reference time (hereinbelow referred to as a change forecast point), may assume that the degree of influence increases more as current time is closer to the change forecast point, and may specify a change index so that the detection sensitivity s may gradually be lowered.

Figure 7:
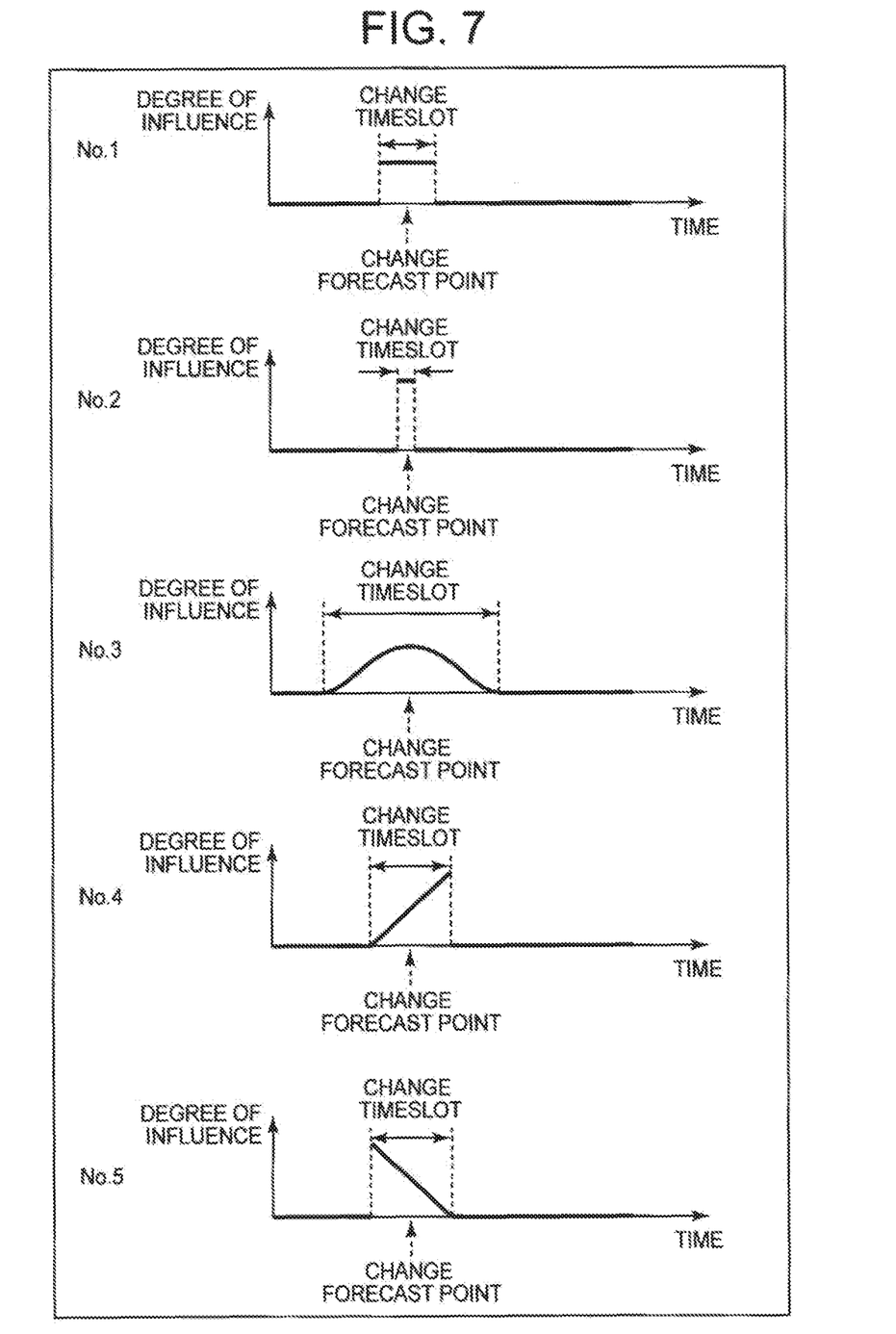
FIG. 7 is an explanatory diagram showing examples of a change index.
Figure 8:
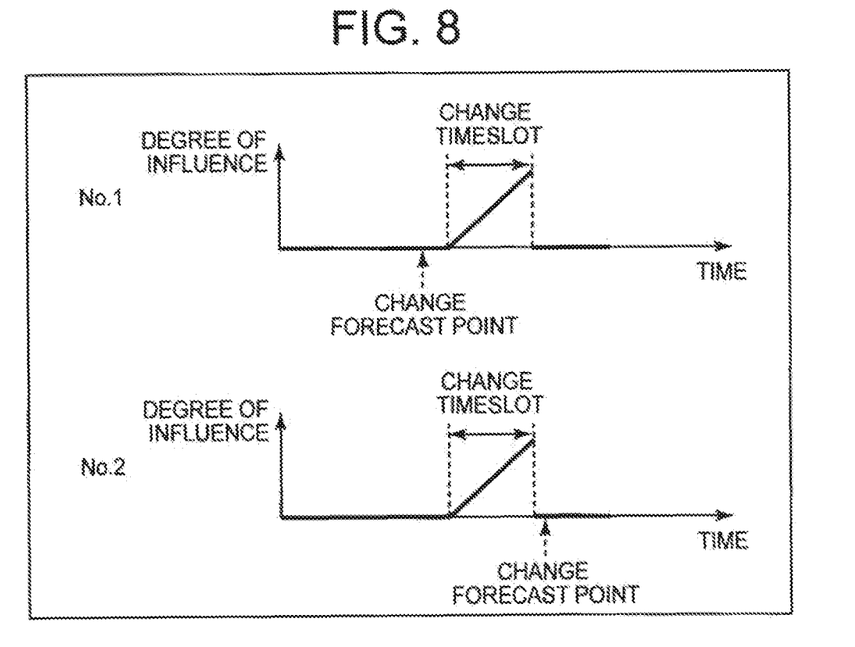
FIG. 8 is an explanatory diagram showing examples of the change index.

Also, FIGS. 7 and 8 are an explanatory diagram showing examples of the change index. As shown in No. 1 of FIG. 7, the change index may have a constant degree of influence in a change timeslot. Note that the example shown in FIG. 5 corresponds to the example shown in No. 1 of FIG. 7.

Also, as shown in No. 2 of FIG. 7, the change index may have a high degree of influence in a short change timeslot. This change index corresponds to a factor in which the illuminance changes sharply and significantly, such as an on operation and an off operation of an indoor illumination.

Also, as shown in No. 3 of FIG. 7, the change index may have a continuously-changing degree of influence in a long change timeslot. Note that, in an actual case, the degree of influence may change discretely.

Also, as shown in No. 4 and No. 5 of FIG. 7, the change index may have a degree of influence having only an increase tendency or only a decrease tendency in a change timeslot. In this manner, the change pattern of the degree of influence in the change timeslot may be asymmetric across the change forecast point.

Also, as shown in No. 1 and No. 2 of FIG. 8, a change timeslot for the degree of influence in the change index may not include the change forecast point. For example, in a case in which it takes time until an actual change is generated in the capture environment after the change forecast point, the change index specifying unit 102 may specify such a change index.

For example, as a pattern for the change index, change index information (a table, a computation formula, or the like) indicating a period of time influenced by each change and an influence pattern may be stored in advance per kind of a region forecast acquired, kind of a predetermined item indicated by the region forecast, or state of the change, and the change index specifying unit 102 may specify a change index on the basis of the information.

For example, the change index specifying unit 102 may specify a similar change index to the sunrise time or the sunset time to time when a solar eclipse is generated.

Also, for example, the change index specifying unit 102 can estimate a timeslot in which the region is shaded or a timeslot in which the region is sunny on the basis of information indicating a position of the sun per season and information indicating a position and a shape of a building and a land and can specify a change index so that the detection sensitivity may be lowered in the timeslot.

Also, for example, the change index specifying unit 102 may specify a timeslot in which rainfall starts and/or a timeslot in which rainfall ends on the basis of weather forecast information and may specify a change index so that the detection sensitivity may be lowered in the timeslot.

Also, the change index specifying unit 102 may specify a change index so that the detection sensitivity may be lowered in a timeslot in which thunder is generated on the basis of weather forecast information. Also, the change index specifying unit 102 may specify a change index so that the detection sensitivity may be lowered in a timeslot in which illuminance is likely to be lowered due to fog or yellow sand on the basis of weather forecast information.

Also, for example, the change index specifying unit 102 may specify a change index so that the detection sensitivity may be lowered in each timeslot before and after turn-on time or turn-off time on the basis of turn-on time and turn-off time information for an indoor illumination or a street lamp.

Meanwhile, on the basis of the information, the change index specifying unit 102 can specify a change index so that the detection sensitivity may be lowered in each timeslot before and after the sunrise time or the sunset time and in each timeslot before and after the rainfall starts.

Figure 13:
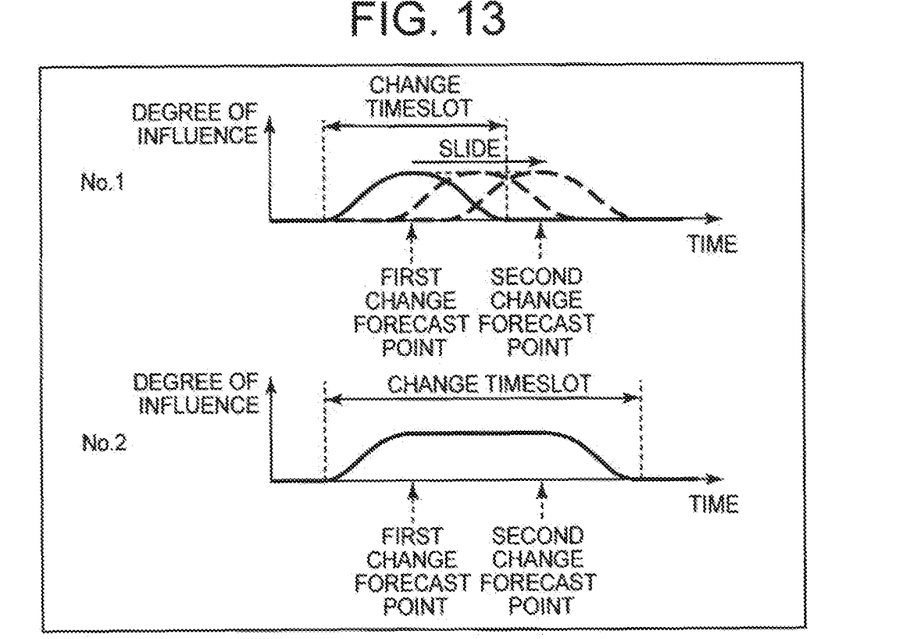
FIG. 13 is an explanatory diagram showing examples of the change index.

Meanwhile, the forecast time can have time width. In this case, the reference time has a time width and is referred to as a change forecast zone. In this case, the change index specifying unit 102 may set central time in a change forecast timeslot as a change forecast point, or may specify as a final change index a maximum value for the degree of influence among values at respective time points in a case in which start time and end time of the change forecast zone are set as a first change forecast point and a second change forecast point and in which a change index derived at the first change forecast point is slid to the second change forecast point as it is (refer to No. 1 of FIG. 13).

The change index specifying unit 102 may specify a change index by applying a pattern for the change index set in advance to a change forecast point on the basis of a kind of a region forecast acquired, a kind of a predetermined item indicated by the region forecast, or a state of the change, for example.

For example, a predetermined storage unit (for example, the information storage unit 104 in FIG. 4) may have stored therein in advance change index information indicating a change timeslot with reference to a change forecast point and the degree of influence or a change pattern for the degree of influence in the change timeslot corresponding to each item of a region forecast. In this case, the change index specifying unit 102 may specify a change index on the basis of the change forecast point and the change index information.

In addition, the change index specifying unit 102 may specify a change index, especially a change timeslot, on the basis of reliability of a region forecast acquired.

For example, when a change index is to be specified, the change index specifying unit 102 may acquire reliability of a region forecast acquired and specify influence time (a time width of the change timeslot) for a corresponding item from the reliability. Meanwhile, to acquire reliability of a region forecast, a predetermined value given in advance to the region forecast may be referred to, or reliability may be acquired from an outside separately or from the region forecast, as in a case of forecast accuracy of a weather forecast.

Figure 9:
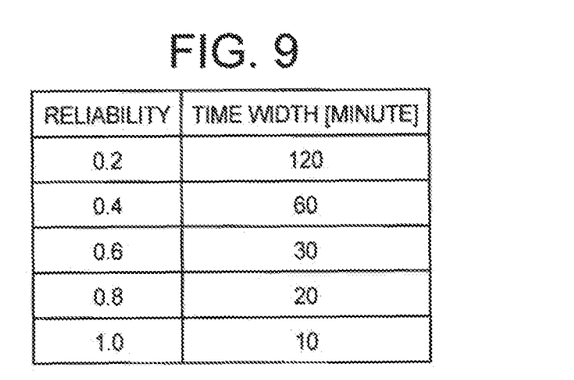
FIG. 9 is an explanatory diagram showing an example of reliability and time width correspondence information.

For example, the change index specifying unit 102 may specify a time width of a change timeslot from reliability on the basis of reliability and time width correspondence information shown in FIG. 9, in which the reliability and the time width of the change timeslot correspond to each other. Note that the example shown in FIG. 9 is an example of a case in which the range of the reliability is 0 or higher and 1 or lower.

Figure 10:
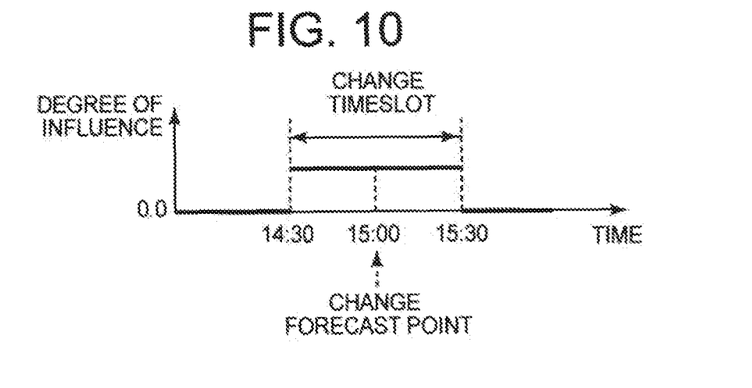
FIG. 10 is an explanatory diagram showing an example of specifying a change timeslot on the basis of reliability.

FIG. 10 is an explanatory diagram showing an example of specifying a change timeslot on the basis of reliability. The example shown in FIG. 10 is an example of specifying a change timeslot in a case in which a weather forecast predicting that sunny skies will change to rainy skies at 15:00 is provided, and in which the reliability is 0.4. In this manner, the change index specifying unit 102 may adjust the time width of the change timeslot on the basis of the reliability of the region forecast.

Figure 11:
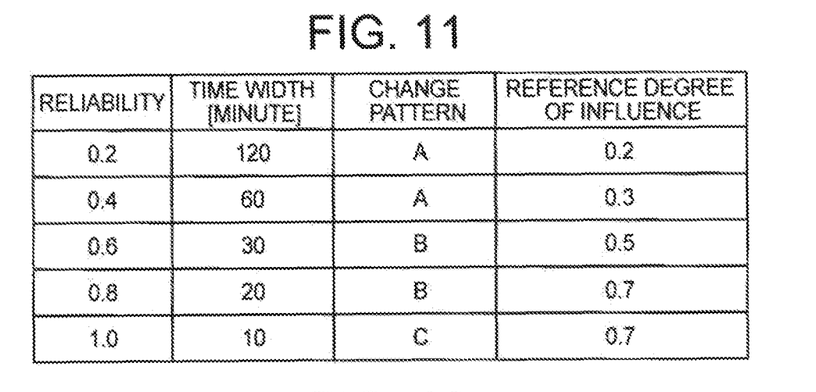
FIG. 11 is an explanatory diagram showing an example of reliability and degree-of-influence correspondence information.

Also, for example, the change index specifying unit 102 may specify a degree of influence and a change pattern thereof in a change timeslot from reliability on the basis of reliability and degree-of-influence correspondence information shown in FIG. 11, in which the reliability, the change pattern of the degree of influence, and a reference degree of influence at the time correspond to each other. Here, the reference degree of influence may be a degree of influence serving as a reference in the change pattern, such as a maximum degree of influence and a minimum degree of influence. Also, the degree-of-influence correspondence information may include various parameters for setting the change pattern of the degree of influence, such as change amounts for respective steps in a case in which the change pattern is in a continuously-changing type. Meanwhile, in each cell for the change pattern in FIG. 11, an identifier for a change pattern registered in advance is provided.

Figure 12:
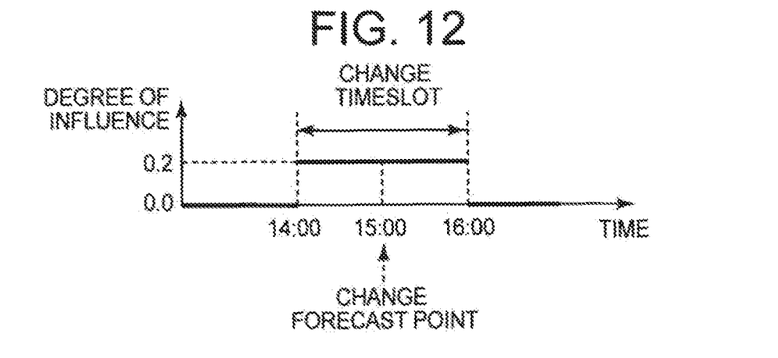
FIG. 12 is an explanatory diagram showing an example of specifying a change pattern of the degree of influence on the basis of reliability.

FIG. 12 is an explanatory diagram showing an example of specifying a change pattern of the degree of influence on the basis of reliability. The example shown in FIG. 12 is an example of the change pattern of the degree of influence in a case in which, to corresponding reliability in the degree-of-influence correspondence information, a constant pattern with the degree of influence set to 0.2 is registered. In this manner, the change index specifying unit 102 may adjust the change pattern of the degree of influence on the basis of the reliability of the region forecast.

Meanwhile, the reliability may be acquired not only for the region forecast but also each of items in a case in which the region forecast includes the plurality of information items. In this case, the change index specifying unit 102 may derive a change index per item.

In a case in which a change index is derived per item, the detection sensitivity setting unit 103 may change detection sensitivity (a parameter for abnormality detection) corresponding to each item.

Meanwhile, the change index specifying unit 102 can combine a plurality of change indices and eventually specify one change index. A method for combining a plurality of change indices will be described in a second exemplary embodiment in detail.

Also, in a case in which there are a plurality of detection sensitivities that are to be set, the change index specifying unit 102 can specify change indices to correspond to the respective detection sensitivities that are to be set. A method for specifying change indices for respective detection sensitivities will be described in a third exemplary embodiment in detail.

Also, the change index specifying unit 102 may not use the change forecast point. For example, the change index specifying unit 102 can compute the temporal change amount (a differential value or a difference value) of the sunshine amount, which is the change amount of the sunshine amount in a predetermined unit time period, and can specify a timeslot in which the temporal change amount is a predetermined threshold value or higher as the change timeslot, or can specify the temporal change amount per time in the timeslot as the degree of influence.

Meanwhile, the change index specifying unit 102 can directly specify the detection sensitivity or the lowering range thereof instead of the degree of influence. For example, the change index specifying unit 102 may specify as the lowering range a value obtained by changing the sign of the degree of influence. Also, for example, the change index specifying unit 102 may specify as the detection sensitivity a value obtained by adding a setting value in a normal state to the lowering range of the detection sensitivity. Meanwhile, at the same time, the change index specifying unit 102 may specify the detection sensitivity when the degree of influence is 0, that is, the detection sensitivity in a timeslot other than the change timeslot.

Also, the change index specifying unit 102 may cause the region forecast acquiring unit 101 to acquire a region forecast corresponding to a predetermined future timeslot (for example, all day tomorrow, or all next week) and specify a change index for the timeslot.

In this case, the detection sensitivity setting unit 103 may apply a change in the detection sensitivity for the timeslot to the schedule or output information indicating a setting value for the detection sensitivity for the timeslot on the basis of the change index for the timeslot specified by the change index specifying unit 102. For example, on the basis of output information, the image analysis unit 2 itself may change the detection sensitivity.

As described above, according to the present exemplary embodiment, the detection sensitivity can be set with an optimal time width and/or lowering range on the basis of information regarding an item causing a change in the capture environment. Accordingly, a parameter for abnormality detection in image analysis can be adjusted optimally along with changes in the capture environment.

Second Exemplary Embodiment

Next, a second exemplary embodiment according to the present invention will be described. The configurations and operations of the image monitoring system 10 and the detection sensitivity adjustment device 100 according to the present exemplary embodiment are basically similar to those in the first exemplary embodiment. However, in the present exemplary embodiment, the region forecast acquiring unit 101 acquires a region forecast regarding a plurality of items.

In this case, the change index specifying unit 102 specifies change indices for respective acquired items and combines the plurality of change indices to derive a final change index.

For example, at the time of combining the plurality of change indices, the change index specifying unit 102 may conduct a simple sum or a weighted sum in terms of the degree of influence to derive the final change index. At this time, as a weight to each item, the aforementioned reliability may be used, for example.

Also, for example, the change index specifying unit 102 may derive the degree of influence on the basis of changes in the illuminance in respective change timeslots estimated on the basis of items to be combined. For example, in a timeslot in which the degree of influence is not 0 in terms of one item (for example, sunset) but in which the illuminance is estimated to be secured sufficiently in terms of the other item (for example, a street lamp), the degree of influence may be estimated as 0.

Meanwhile, the above methods can be combined.

Figure 14:
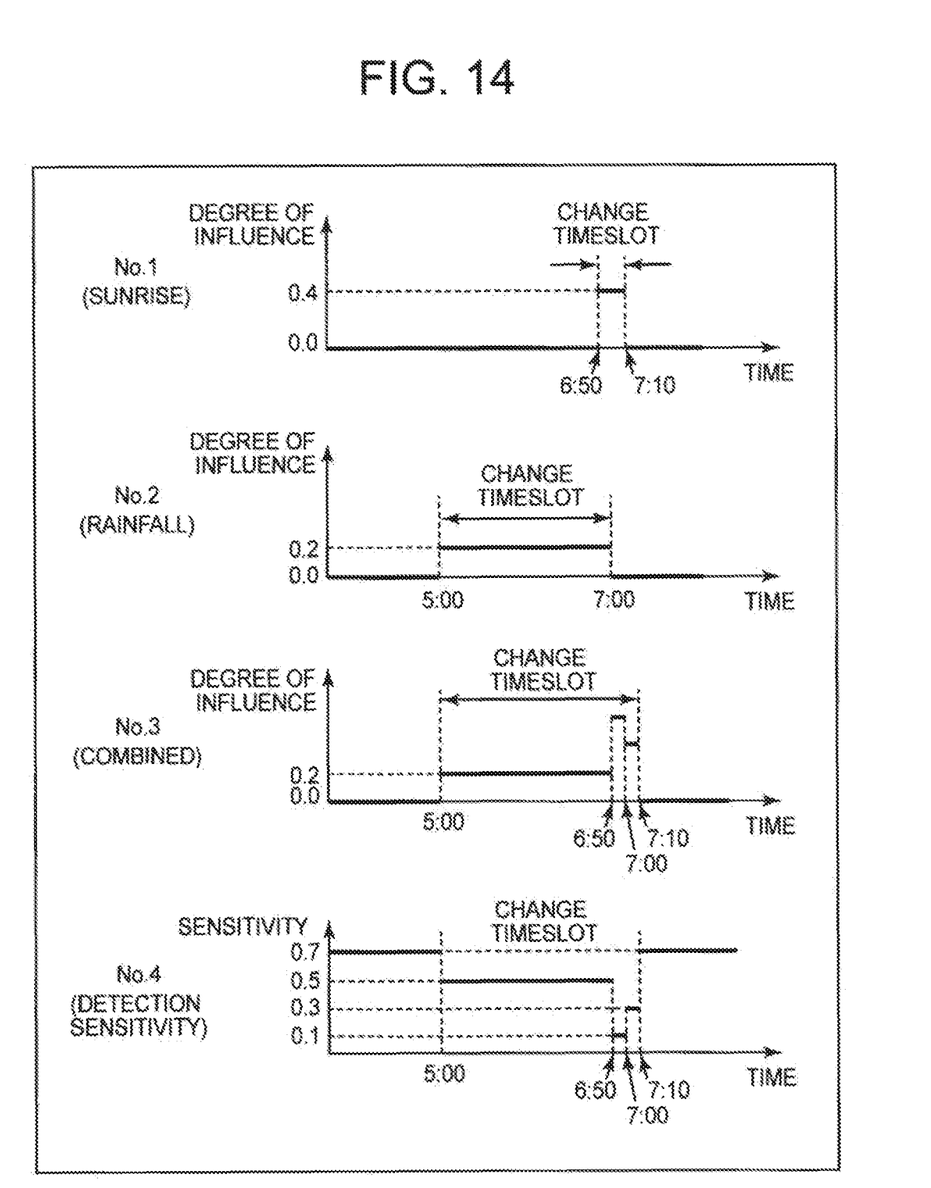
FIG. 14 is an explanatory diagram showing an example of combining change indices.

FIG. 14 is an explanatory diagram showing an example of combining change indices. No. 1 of FIG. 14 shows an example of a change index based on sunrise time, No. 2 of FIG. 14 shows an example of a change index based on rainfall, and No. 3 of FIG. 14 shows an example of a change index obtained by combining these change indices. The example shown in No. 1 of FIG. 14 is an example in which, with reference to 07:00, which is the sunrise time, the degree of influence in each ten-minute period before and after the sunrise time is set to +0.4. Also, the example shown in No. 2 of FIG. 14 is an example in which, with reference to 06:00, which is the forecast time for start of rainfall based on rainfall information, the degree of influence in each sixty-minute period before and after the forecast time is set to +0.2.

As shown in No. 3 of FIG. 14, the change index specifying unit 102 may perform a simple sum by summing the degrees of influence in the change timeslots of the respective change indices and set the result as a combined change index, for example. No. 4 of FIG. 14 shows an example of setting detection sensitivity based on the combined change index.

Meanwhile, although the change index specifying unit 102 uses as a combining method the simple sum, in which the degrees of influence in the change timeslots of the respective change indices are summed, in the example shown in FIG. 14, the change index specifying unit 102 may perform a weighted sum, in which weights set for respective items are used at the time of summing the degrees of influence. For example, in a case in which the reliability of the sunrise information is 0.8, and in which the reliability of the rainfall information is 0.2, the change indices shown in No. 1 of FIG. 14 and No. 2 of FIG. 14 are summed by means of the weighted sum with use of the respective reliability values as weights. In this case, the degree of influence E in each timeslot is as follows:

Timeslot from 5:00 to 6:50
E=0.20*0.2=0.04
Timeslot from 6:50 to 7:00
E=(0.40*0.8)+(0.20*0.2)=0.36
Timeslot from 7:00 to 7:10
E=0.40*0.8=0.32

Figure 15:
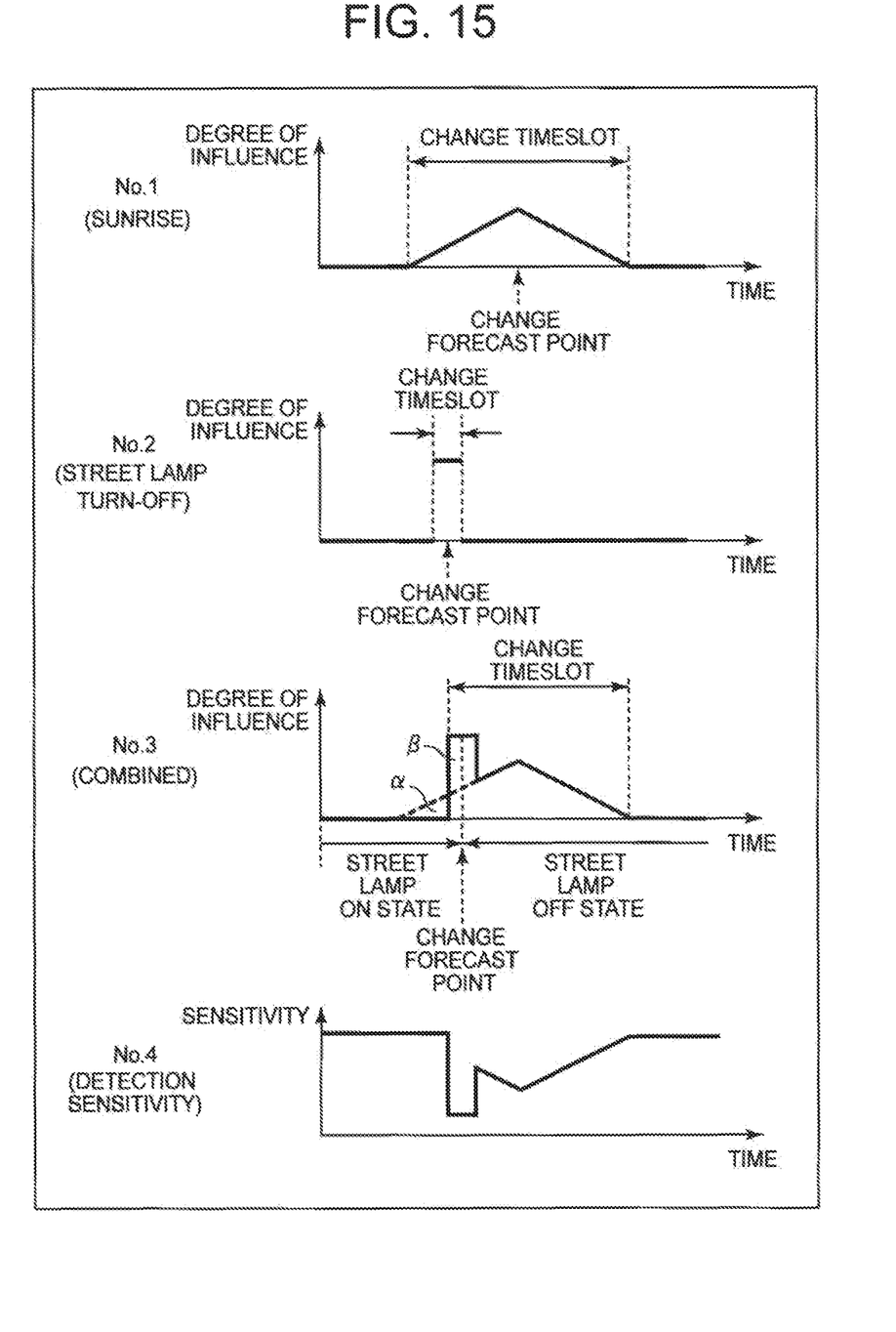
FIG. 15 is an explanatory diagram showing an example of combining change indices.

FIG. 15 is an explanatory diagram showing an example of a combining method based on the estimated illuminance. No. 1 of FIG. 15 shows an example of a change index based on sunrise time, No. 2 of FIG. 15 shows an example of a change index based on turn-off time of a street lamp, and No. 3 of FIG. 15 shows an example of a change index obtained by combining these change indices. The example shown in No. 1 of FIG. 15 is an example in which the degree of influence gradually gets larger as the sunrise time is closer with reference to the sunrise time. Also, the example shown in No. 2 of FIG. 15 is an example in which the degree of influence is large in a short timeslot with reference to the turn-off time of the street lamp.

In this case, for example, the change index specifying unit 102 may estimate that the illuminance is secured sufficiently while the street lamp is in an on state even before and after sunrise or sunset and may estimate that the degree of influence by the sunrise or sunset is 0 (refer to a in No. 3 of FIG. 15). That is, even before and after the sunrise, the degree of influence by the sunrise may be set to 0 at the time of combination in a case in which the turn-off time of the street lamp has not passed (in a case in which the street lamp is in an on state). Similarly, even before and after the sunset, the degree of influence by the sunset may be set to 0 at the time of combination in a case in which the turn-on time of the street lamp has passed (in a case in which the street lamp is in an on state). Meanwhile, even while the street lamp is in an on state, the degree of influence in the change timeslot by the street lamp itself is effective as it is (refer to β in No. 3 of FIG. 15).

As a result, as shown in No. 4 of FIG. 15, control is available in which the detection sensitivity is not lowered even in the change timeslot by the sunrise except in the change timeslot by the turn-on time of the street lamp.

Also, similarly, even before and after the turn-on time of the street lamp, the degree of influence by the turn-on time of the street lamp may be set to 0 at the time of combination in an earlier timeslot than the change timeslot by the sunset time (in a case in which it is still bright). Similarly, even before and after the turn-off time of the street lamp, the degree of influence by the turn-off time of the street lamp may be set to 0 at the time of combination in a later timeslot than the change timeslot by the sunrise time (in a case in which it is already bright). Meanwhile, the change index specifying unit 102 may lower the degree of influence by a predetermined amount instead of setting the degree of influence to 0.

As described above, according to the present exemplary embodiment, on the basis of predictive information regarding a plurality of items, detection sensitivity can be set optimally along with changes in a capture environment.

Third Exemplary Embodiment

Next, a third exemplary embodiment of the present invention will be described. The configurations and operations of the image monitoring system 10 and the detection sensitivity adjustment device 100 according to the present exemplary embodiment are basically similar to those in the first exemplary embodiment.

In the present exemplary embodiment, the change index specifying unit 102 specifies change indices to correspond to the plurality of respective detection sensitivities that are to be set.

For example, the change index specifying unit 102 may store in a predetermined storage unit (for example, the information storage unit 104 in FIG. 4) information (a reference degree of influence or the like) indicating whether or not there is an influence and how much influence there is for each detection sensitivity corresponding to each item of a region forecast, and may specify a change index for each detection sensitivity on the basis of the information.

Alternatively, the change index specifying unit 102 may specify detection sensitivity to which one change index derived for each item is to be applied on the basis of only whether or not there is an influence. In this case, the detection sensitivity setting unit 103 changes the designated detection sensitivity on the basis of the change index.

An example of the detection sensitivity is illuminance change sensitivity, which is a parameter at the time of adjusting brightness of an image frame in the image analysis unit 2. For example, in a case in which the illuminance change sensitivity is designated as an application destination, the detection sensitivity setting unit 103 may set the illuminance change sensitivity to be lower (in a direction in which brightness adjustment of the image frame is weakened) as the degree of influence is larger.

Another example is background change sensitivity, which corresponds to an extraction threshold value at the time of extracting a difference image by comparison between an image frame subject to brightness adjustment and a previous image frame. For example, in a case in which the background change sensitivity is designated as an application destination, the detection sensitivity setting unit 103 may set the background change sensitivity to be lower (in a direction in which a small difference is not extracted) as the degree of influence is larger.

Meanwhile, the above detection sensitivities are illustrative only, and other detection sensitivities may be used.

Also, examples of setting each detection sensitivity to an item are as follows. For example, as for sunrise, the change index specifying unit 102 lowers the illuminance change sensitivity since it is brighter due to the sunrise and does not lower the background change sensitivity since the background is not changed in general. Also, as for the sunrise, since accurate time can be acquired, the reliability may be high, and the change timeslot may be short, that is, the timeslot in which the sensitivity is low may be short, regardless of the kind of the sensitivity.

Also, as for rainfall, since it is dark due to the rainfall, the illumination change sensitivity may slightly be lowered. Further, as for the rainfall, since a paddle is generated, the background change sensitivity may be lowered not to detect the paddle. Also, as for the rainfall, since time in a weather forecast may be erroneous, the reliability may be low, and the change timeslot may be long, that is, the timeslot in which the sensitivity is low may be long, regardless of the kind of the sensitivity. In particular, a period of time spent before the paddle is generated is liable to be erroneous, the change timeslot may be longer or be extended in a later direction in terms of the change index for the background change sensitivity.

Also, as for snowfall, since the weather forecast is liable to be wrong, the reliability may be low, and the change timeslot may be long, that is, the timeslot in which the sensitivity is low may be long, regardless of the kind of the sensitivity. Also, in a case of snowfall, since it is bright due to reflection to snow, the illumination change sensitivity may slightly be lowered (for example, the degree of influence for the change index applied to the illumination change sensitivity is set to a value other than 0). Also, in consideration of a case in which the region is all white due to snowfall, the background change sensitivity may significantly be lowered as time goes by (for example, the degree of influence for the change index applied to the background change sensitivity is designated to be higher as time goes by).

As described above, according to the present exemplary embodiment, in a case in which there are a plurality of detection sensitivities, respective optimal settings can be done.

Other Exemplary Embodiments

Meanwhile, the above exemplary embodiments can be combined.

Also, in each of the above exemplary embodiments, a different change index can be specified per image capturing unit. For example, to correspond to each image capturing unit, change index information, reliability and time width correspondence information, reliability and degree-of-influence correspondence information, reliability information indicating reliability, and weight information indicating a weight may be stored, and a change index may be specified per image capturing unit on the basis of the information.

Accordingly, for example, a use method can be conceived in which an image capturing unit capturing an image indoors is set so that the degree of influence by sunrise and sunset may be 0 (for example, the weight is set to 0).

Also, these pieces of information may be tuned by an appropriate learning algorithm. At this time, as training data, false detection information indicating whether previous detection results are true or false may be used. For example, the detection sensitivity adjustment device 100 may include a not-shown learning unit, and the learning unit may change various parameters, change index information, and the like for use in specifying a change index on the basis of the false detection information and change history of detection sensitivity.

Figure 16:
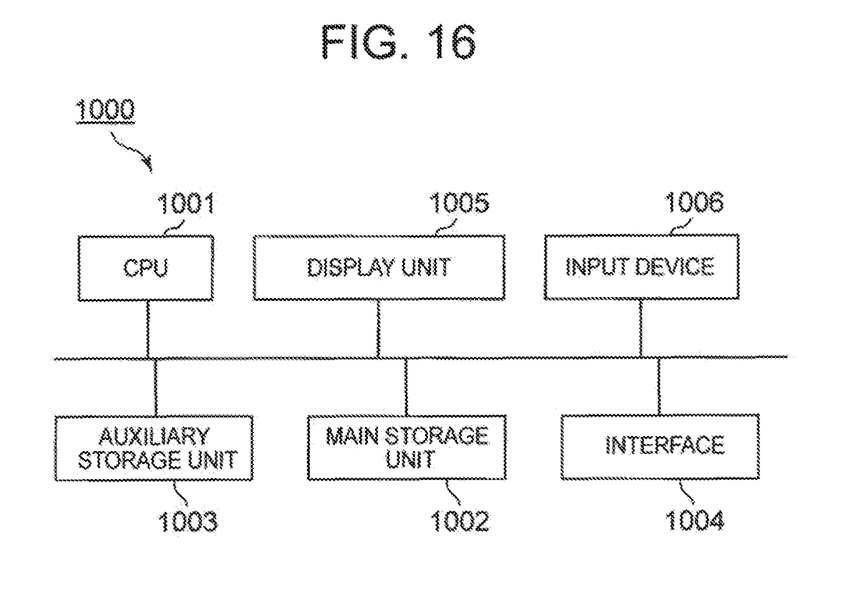
FIG. 16 is a block diagram showing a configuration example of a computer according to an exemplary embodiment of the present invention.

Next, a configuration example of a computer according to an exemplary embodiment of the present invention will be described. FIG. 16 is a schematic block diagram showing a configuration example of a computer according to the exemplary embodiment of the present invention. A computer 1000 includes a CPU 1001, a main storage unit 1002, an auxiliary storage unit 1003, an interface 1004, a display unit 1005, and an input device 1006.

The aforementioned image analysis unit 2 and detection sensitivity adjustment unit 4 (detection sensitivity adjustment device 100) may be implemented in the computer 1000, for example. In this case, operation of each unit may be stored in the auxiliary storage unit 1003 in a form of a program. The CPU 1001 reads out a program from the auxiliary storage unit 1003, expands the program on the main storage unit 1002, and executes predetermined processing according to the above exemplary embodiments in accordance with the program.

The main storage unit 1002 is an example of a unit (a not-temporary tangible medium) storing data and the program in the computer and enabling the CPU 1001 to directly read and write the data and the program therein and therefrom.

The auxiliary storage unit 1003 is an example of a not-temporary tangible medium. Other examples of the not-temporary tangible medium are a magnetic disk, a magneto-optical disk, a CD-ROM, a DVD-ROM, and a semiconductor memory connected via the interface 1004. Also, in a case in which the program is delivered to the computer 1000 via communication lines, the computer 1000 may receive the program, expand the program on the main storage unit 1002, and execute the predetermined processing according to the above exemplary embodiments.

Also, the program may execute part of the predetermined processing according to the above exemplary embodiments. Further, the program may be a difference program executing the predetermined processing according to the above exemplary embodiments as a result of combination with another program prestored in the auxiliary storage unit 1003.

The interface 1004 transmits and receives information to and from another device. Also, the display unit 1005 provides information to a user. Also, the input device 1006 receives input of information from the user.

Also, depending on the processing content in the exemplary embodiments, some components of the computer 1000 can be omitted. For example, in a case in which the device provides no information to the user, the display unit 1005 can be omitted.

Also, a part or all of each component of each device is executed by general-purpose or dedicated circuitry, processor, or the like, or a combination thereof. The circuitry, processor, or the like, or the combination thereof may include a single chip or a plurality of chips connected via a bus. Also, a part or all of each component of each device may be executed by a combination of the aforementioned circuitry or the like and a program.

In a case in which a part or all of each component of each device is executed by a plurality of information processing devices, circuits, and the like, the plurality of information processing devices, circuits, and the like may be provided in a focused or distributed manner. For example, the information processing devices, circuits, and the like may be executed in a manner in which the respective units are connected via a communication network, such as a client-and-server system and a cloud computing system.

Meanwhile, the aforementioned respective exemplary embodiments can also be described as the following supplementary notes.

(Supplementary note 1) An image monitoring system includes a region forecast acquiring means (for example, a region forecast acquiring unit 101) that acquires a region forecast which is predictive information about a predetermined item designated as a factor causing a change in a capture environment that is the environment of a capture region, wherein the predictive information serves as predictive information about the predetermined item at a future time in a predetermined region including the capture region where an image to be image-analyzed is captured, a change index specifying means (for example, a change index specifying unit 102) that specifies, based on the acquired region forecast, a change index including at least a change timeslot that is a timeslot during which the change in the capture environment is brought about, and a change means (for example, a detection sensitivity setting unit 103), that changes, based on the specified change index, a setup parameter that is a parameter for detecting an abnormality in the image analysis.

(Supplementary note 2) The image monitoring system according to supplementary note 1, wherein the change index specifying means specifies the change index based on reliability of the region forecast or the predetermined item in the region forecast.

(Supplementary note 3) The image monitoring system according to supplementary note 1 or 2, wherein the change index further includes a degree of influence which the change of the capture environment in the change timeslot has on analysis performance of the image analysis and a change pattern thereof.

(Supplementary note 4) The image monitoring system according to any one of supplementary notes 1 to 3, wherein the change index specifying means specifies the change index based on a weight defined to the region forecast or the predetermined item in the region forecast.

(Supplementary note 5) The image monitoring system according to any one of supplementary notes 1 to 4, wherein the region forecast acquiring means acquires a region forecast regarding a plurality of predetermined items, and wherein the change index specifying means specifies the change indices for the respective predetermined items and combines the plurality of change indices to derive a final change index.

(Supplementary note 6) The image monitoring system according to supplementary note 5, wherein, at time of combining the plurality of change indices, the change index specifying means conducts a simple sum or a weighted sum in terms of the degree of influence in each time, or derives the degree of influence based on changes in illuminance in the respective change timeslots estimated based on the items to be combined.

(Supplementary note 7) The image monitoring system according to any one of supplementary notes 1 to 6, wherein the region forecast is predictive information regarding a predetermined item regarded as a factor causing a change in an illumination state in a capture region, and wherein the predetermined item includes sunrise time, sunset time, a rainfall amount, a sunshine amount, a snow amount, weather, a wind amount, a solar eclipse, a street lamp, or an indoor illumination.

(Supplementary note 8) The image monitoring system according to any one of supplementary notes 1 to 7, wherein the change index specifying means specifies the change indices to correspond to the plurality of respective setup parameters, and wherein the change means changes the plurality of setup parameters based on the change indices.

(Supplementary note 9) The image monitoring system according to any one of supplementary notes 1 to 8, wherein the region forecast acquiring means acquires a region forecast corresponding to a predetermined future timeslot, wherein the change index specifying means specifies the change index for the timeslot, and wherein the change means applies a change in the setup parameter for the timeslot to a schedule or outputs information indicating a setting value for the setup parameter for the timeslot based on the change index.

(Supplementary note 10) The image monitoring system according to any one of supplementary notes 1 to 9, wherein the change index specifying means specifies the change index by applying a period of time influenced by a change in terms of the predetermined item and an influence pattern thereof set in advance per predetermined item or state of the change in terms of the predetermined item to a change forecast point, which is a change point for the predetermined item indicated by the region forecast.

(Supplementary note 11) The image monitoring system according to supplementary note 10, including a change index information storage means storing in advance change index information indicating the change timeslot with reference to the change forecast point and the degree of influence or a change pattern for the degree of influence in the change timeslot corresponding to the predetermined item, wherein the change index specifying means specifies the change index based on the change index information.

(Supplementary note 12) The image monitoring system according to supplementary note 11, including a second region forecast acquiring means acquiring false detection information indicating whether previous detection results of the image analysis are true or false, change content storage means storing change history of the setup parameter, and a learning means changing the parameter or the change index information for use in specifying the change index based on the false detection information and the change history.

(Supplementary note 13) An image monitoring method including acquiring a region forecast which is predictive information about a predetermined item designated as a factor causing a change in a capture environment, wherein the predictive information serves as predictive information about the predetermined item at a future time in a predetermined region including the capture region where an image to be image-analyzed is captured, specifying, based on the acquired region forecast, a change index including at least a change timeslot, which is a timeslot in which a visual change is liable to be generated in the capture region, and changing, based on the specified change index, a setup parameter that is a parameter for detecting an abnormality in the image analysis.

(Supplementary note 14) An image monitoring program causing a computer to execute processing of acquiring a region forecast which is predictive information about a predetermined item designated as a factor causing a change in a capture environment, wherein the predictive information serves as predictive information about the predetermined item at a future time in a predetermined region including the capture region where an image to be image-analyzed is captured, processing of specifying, based on the acquired region forecast, a change index including at least a change timeslot, which is a timeslot in which a visual change is liable to be generated in the capture region, and processing of changing, based on the specified change index, a setup parameter that is a parameter for detecting an abnormality in the image analysis.

Although the present invention has been described above with reference to the present exemplary embodiments, the present invention is not limited to the above exemplary embodiments. The configurations and the details of the present invention can be altered in various ways so as to be understandable by those skilled in the art within the scope of the present invention.

The present application is based on and claims priority to Japanese Patent Application No. 2017-066909, filed on Mar. 30, 2017, the entire disclosure of which is hereby incorporated by reference herein.

INDUSTRIAL APPLICABILITY

The present invention can appropriately be applied to a system detecting an abnormality with use of an image analysis technique. Note that what is detected may not be an abnormality but may be a specific state, a non-stationary state, or the like.

REFERENCE SIGNS LIST

10 Image monitoring system
1 Image input unit
2 Image analysis unit
3 Result output unit
4 Detection sensitivity adjustment unit
100 Detection sensitivity adjustment device
101 Region forecast acquiring unit
102 Change index specifying unit
103 Detection sensitivity setting unit
104 Information storage unit
1000 Computer
1001 CPU
1002 Main storage unit
1003 Auxiliary storage unit
1004 Interface
1005 Display unit
1006 Input device

The invention claimed is:

1. An image monitoring system comprising:
a processor; and
a memory storing a program executed by the processor, the program including steps of:
acquiring a region forecast, wherein the region forecast indicates prediction information of an item designated as a factor for affecting a capture environment of a predetermined region, and wherein the predetermined region includes an area for image analysis;
specifying an index based on the region forecast, wherein the index at least includes a timeslot during which the capture environment may change;
changing, based on the specified index, a setup parameter for anomaly detection in the image analysis; and
specifying the index by applying a period of time influenced by a change in terms of the item and an influence pattern thereof set in advance per item or state of the change in terms of the item to a change forecast point, which is a change point for the item indicated by the region forecast.

2. The image monitoring system according to claim 1, wherein the program further includes the step of:
specifying the index based on reliability of the region forecast or the item in the region forecast.

3. The image monitoring system according to claim 1, wherein the index further includes a degree of influence which the change of the capture environment in the timeslot has on analysis performance of the image analysis and a change pattern thereof.

4. The image monitoring system according to claim 1, wherein the program further includes the steps of:
acquiring the region forecast regarding the plurality of items, and
specifying the indices for the respective items and combines the plurality of indices to derive a final index.

5. The image monitoring system according to claim 4, wherein the program further includes the step of:
at time of combining the plurality of indices, conducting a simple sum or a weighted sum in terms of the degree of influence in each time, or deriving the degree of influence based on changes in illuminance in the respective timeslots estimated based on the items to be combined.

6. The image monitoring system according to claim 1, wherein the region forecast is predictive information regarding the item regarded as a factor causing a change in an illumination state in a capture region, and
wherein the item includes sunrise time, sunset time, a rainfall amount, a sunshine amount, a snow amount, weather, a wind amount, a solar eclipse, a street lamp, or an indoor illumination.

7. The image monitoring system according to claim 1, wherein the program further includes the steps of:

specifying the indices to correspond to the plurality of respective setup parameters, and changing the plurality of setup parameters based on the indices.

8. The image monitoring system according to claim 1, wherein the program further includes the steps of:

acquiring a region forecast corresponding to a predetermined future timeslot, specifying the index for the timeslot, and applying a change in the setup parameter for the timeslot to a schedule or outputting information indicating a setting value for the setup parameter for the timeslot based on the index.

9. The image monitoring system according to claim 1, wherein the program further includes the step of:

specifying the index based on a weight defined to the region forecast or the item in the region forecast.

10. An image monitoring method comprising:

acquiring a region forecast, wherein the region forecast indicates prediction information of an item designated as a factor for affecting a capture environment of a predetermined region, and wherein the predetermined region includes an area for image analysis;

specifying an index based on the region forecast, wherein the index at least includes a timeslot during which the capture environment may change;

changing, based on the specified index, a setup parameter for anomaly detection in the image analysis; and specifying the index by applying a period of time influenced by a change in terms of the item and an influence pattern thereof set in advance per item or state of the change in terms of the item to a change forecast point, which is a change point for the item indicated by the region forecast.

11. A non-transitory computer-readable capturing medium having captured therein an image monitoring program causing a computer to execute:

processing of acquiring a region forecast, wherein the region forecast indicates prediction information of an item designated as a factor for affecting a capture environment of a predetermined region, and wherein the predetermined region includes an area for image analysis;

processing of specifying an index based on the region forecast, wherein the index at least includes a timeslot during which the capture environment may change;

processing of changing, based on the specified index, a setup parameter for anomaly detection in the image analysis; and processing of specifying the index by applying a period of time influenced by a change in terms of the item and an influence pattern thereof set in advance per item or state of the change in terms of the item to a change forecast point, which is a change point for the item indicated by the region forecast.

* * * * *